United States Patent [19]

Hanatani

[11] Patent Number: 5,093,784

[45] Date of Patent: Mar. 3, 1992

[54] DATA PROCESSOR WITH EFFICIENT TRANSFER BETWEEN SUBROUTINES AND MAIN PROGRAM

[75] Inventor: Syuichi Hanatani, Tokyo, Japan

[73] Assignee: NEC Corporation, Tokyo, Japan

[21] Appl. No.: 563,806

[22] Filed: Aug. 6, 1990

Related U.S. Application Data

[63] Continuation of Ser. No. 161,088, Feb. 26, 1988, abandoned.

[30] Foreign Application Priority Data

Feb. 27, 1987 [JP] Japan ................ 62-43136
Feb. 27, 1987 [JP] Japan ................ 62-43137
Feb. 27, 1987 [JP] Japan ................ 62-43138

[51] Int. Cl.⁵ .......................................... G06F 7/00
[52] U.S. Cl. ........................ 395/775; 364/232.3; 364/232.1; 364/228.2; 364/DIG. 1
[58] Field of Search ............................ 364/200, 900

[56] References Cited

U.S. PATENT DOCUMENTS

| | | | |
|---|---|---|---|
| 4,450,519 | 5/1984 | Guttag et al. | 364/200 |
| 4,484,261 | 11/1984 | Brantingham | 364/200 |
| 4,511,961 | 4/1985 | Penton | 364/200 |
| 4,586,131 | 4/1986 | Caudel et al. | 364/200 |
| 4,802,116 | 1/1989 | Ward et al. | 364/900 |
| 4,841,476 | 6/1989 | Mitchell et al. | 364/900 |
| 4,868,822 | 9/1989 | Scott et al. | 364/200 |

Primary Examiner—Joseph A. Popek
Assistant Examiner—Rebecca L. Rudolph
Attorney, Agent, or Firm—Foley & Lardner

[57] ABSTRACT

A data processor utilizing a main memory which has a first region for storing a first type of software instruction group for realizing an architecture to prescribe operations of the data processor and a second region for storing a second type of software instruction group which is systematized separately from the first type of software instruction group. A plurality of first registers are defined by a software instruction belonging to the first type of software instruction group. Also provided are a plurality of second registers which are defined by a software instruction belonging to the second type of software instruction group. Further, executing circuitry is provided for executing software instructions belonging to the first type of software instruction group from the main memory in accordance with an instruction program consisting of the second type of software instruction group.

3 Claims, 7 Drawing Sheets

SUM $G_i^0 G_i^1, X, a_0$

① Setting of subroutine operating mode   <D>

② Branching to SUM subroutine routine   <D>

③ $A_0 \leftarrow \{B\}$   <D>

$A_1 \leftarrow \{X\}$   <D>

$A_2 \leftarrow$ DISP part of 1st instruction register   <D>

④ $A_0 \leftarrow \{A_0\} + \{A_2\}$   <A>
    = Developed address value $a_0$
    = $\{B\}$ + DISP ⑤ $A_3 \leftarrow$ Next instruction address of SUM   <A>
   $a_3$
   = Instruction address of SUM + instruction word length ⑥ Address translation of $a_0$   <T>

⑦ $A_8 \leftarrow \{a_0\} = S_0$   <O>

⑧ $A_{10} \leftarrow \{G_i^1\}$   <O>

⑨ $A_{10} \leftarrow \{A_{10}\} - 1$   <E>
    = $\{G_i^1\} - 1$ $a_3$ NEXT

FIG. 7A

SUM Subroutine

| | | |
|---|---|---|
| → $a_2$ load $A_9$, $a(A_0, A_1)$ | ① $A_0 \leftarrow \{A_0\} + \{A_1\}$ | $<A>$ |
| | ② Address translation of address $(\{A_0\}+\{A_1\})$ | $<I>$ |
| | ③ $A_9 \leftarrow \{\{A_0\} + \{A_1\}\}$ | $<\bar{O}>$ |
| add $A_8$, $A_9$ | ① $A_8 \leftarrow \{A_8\} + \{A_9\}$ | $<E>$ |
| ⌐ BCT $A_{10}, a_2$ | ① Address development of $a_2$ | $<A>$ |
| | ② Address translation of $a_2$ | $<T>$ |
| | ③ $A_{10} \leftarrow \{A_{10}\} - 1$ | $<E>$ |
| | ④ if $A_{10} \neq 0$ then G$\bar{o}$ to $a_2$ | |
| load $G^0$, $A_8$ | ① $G^0 \leftarrow \{A_8\}$ | $<E>$ |
| return $A_3$ | ① Reading of $A_3$ | $<A>$ |
| | ② Address translation of $A_3$ | $<T>$ |
| | ③ Reading of NEXT | $<I>$ |

FIG. 7B

DATA PROCESSOR WITH EFFICIENT TRANSFER BETWEEN SUBROUTINES AND MAIN PROGRAM

This application is a continuation of application Ser. No. 07/161,088, filed Feb. 26, 1988, now abandoned.

BACKGROUND OF THE INVENTION

The present invention relates to a data processor for use by two types of software instruction groups.

When one processing routine for realizing one function of a data processor is to be shared between a plurality of programmers or processes, the processing routine is usually defined as one macroinstruction and used as such.

In order to realize this with software, a subroutine procedure is excuted, which is a self-consistent series of instructions for solving some of the problems to be processed by a part of one program. Thus, when a program is to call this procedure, the caller program temporarily saves, in a memory, the values of registers so far used and remaining in use after the execution of this procedure. Afterwards, hardware units for operating a subroutine procedure on the callee side, for instance registers, are placed under the control of the subroutine procedure on the callee side.

When a return to the caller program is to take place in response to the completion of the execution of this procedure, a recovery action is taken to return the values saved in the memory to hardware units, such as registers. These saving/recovery actions of registers deteriorate the performance of the data processor.

To prevent this performance deterioration, development of a new technique is demanded in order to realize the processing routine of the subroutine procedure as a software instruction and to achieve its detailed operation with hardware functions.

The most flexible technique to meet this demand is a microprogram control technique, which is used as much more of a flexible means than, and free from the complexity of, hardware control realized by wired logic. For instance, for adding a new instruction or altering an existing instruction, it is sufficient to modify the pertinent microprogram in the control memory.

Another benefit of this microprogram control technique is that it dispenses with the aforementioned saving/recovery actions of registers and prevents performance deterioration by using work registers, which are not visible from the user of software instructions.

To take advantage of these benefits, early routines realized by a microprogram covered basic instruction processing, interruption processing and exception processing, but it later became possible to realize with the use of a microprogram such functions as process control, interprocess synchronization, procedure calling and partial support to a virtual machine monitor.

The increase of routines to be covered by a microprogram, however, entails increases in the number of steps in the microprogram and in the dimensions of the control memory for storing the microprogram.

The operation of the microprogram is performed using a control memory. However, an instruction control circuit and an instruction register for controlling the execution of each instruction are not used during the microprogram operation.

A serious problem involved in the microprogram control technique, furthermore, lies in the tight subordination of this program to hardware. Thus, the positions and sizes of the control memory for storing a microprogram, the size of the hardware unit to be controlled by one word in that control memory, the command repertoire, and the interface between the hardware and the microprogram concerning the timing of command issues and so forth are usually determined by the hardware's circumstances. Therefore, the coverage of a microprogram, developed at an enormous cost and spending many manhours, is limited to a single developed hardware machine, and is incompatible with other hardware machines. Consequently, a microprogram has to be developed anew every time a new hardware machine is developed, resulting in the disadvantage of not permitting accumulation of hardware and microprogram assets.

From another aspect of the present invention, the following problem is noted. Even if the basic architecture of the data processor currently in operation is 10 years or even more than 20 years old, a newly developed unit may be designed to be compatible with the old machine's software assets accumulated over the years. For instance, the current level of technology readily permits doubling of the number of registers. However, to make all the doubled registers software-visible is impossible without sacrificing compatibility.

Meanwhile, software has to write or read data into or out of the memory frequently because of the small number of registers. Therefore, however fast the hardware may execute a given instruction, the overall performance of the whole system cannot be improved.

SUMMARY OF THE INVENTION

An object of the present invention is, therefore, to provide a data processor intended to maximize the hardware resources available to new software described by a newly added instruction while maintaining compatibility with existing software.

Another object of the invention is to provide a data processor intended to simplify interfacing with hardware and to make possible accumulation of developed assets while succeeding the advantages of the microprogram control technique.

According to a first aspect of the invention, there is provided a first data processor comprising main memory having a region for storing a first type of software instruction group for realizing an architecture to prescribe the operations of the data processor and another region for storing a second type of software instruction group, not visible from the first type of software instruction group and systematized separately from the first type of software instruction group; a plurality of first registers defined by a software instruction belonging to the first type of software instruction group; a plurality of second registers defined by the second type of software instruction group; and an execution unit for executing software instructions belonging to the first type of software instruction group from said main memory in accordance with an instruction program (hereinafter called "subroutine") consisting of the second type of software instruction group.

According to a second aspect of the invention, there is provided a second data processor structured by adding to the first data processor a storage unit, which is one of the plural second registers, for storing the addresses of instructions subsequent to software instructions of the first type to be realized according to said subroutine; and execution unit for executing a branching instruction for fetching the subsequent instructions in response to the completion of the execution of said subroutine and on the basis of a value in said storage unit.

According to a third aspect of the invention, there is provided a third data processor structured by adding to the first data processor instruction storage unit for storing software instructions belonging to the first type of software instruction group, and access circuitry for accessing the address of the subroutine stored in the region of the main memory for storing the second type of software instruction group on the basis of the op-codes of software instructions stored in the instruction storage unit.

BRIEF DESCRIPTION OF THE DRAWINGS

Other objects, features and advantages of the present invention will be more apparent from the detailed description hereunder when taken in conjunction with the accompanying drawings, in which:

FIG. 7A is a diagram for explaining the operation of the adding (SUM) instruction; and FIG. 7B is a diagram for explaining the operation of the subroutine;

In FIGS. 1 to 7B, the same reference codes represent respectively the same or corresponding structural elements.

DETAILED DESCRIPTION OF THE PREFERRED EMBODIMENT

An embodiment of the present invention will now be described in detail with reference to the drawings.

First will be explained the format of the first type of software instruction, which the invention presupposes.

Figure 3:
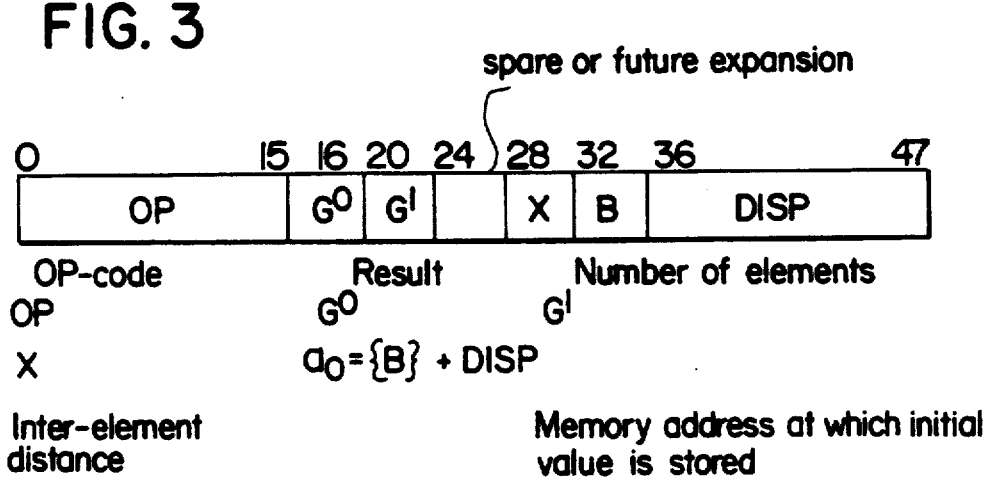
FIG. 3 is a diagram illustrating the format of an adding (SUM) instruction.

Referring to FIG. 3, an adding (SUM) instruction comprises an operation code (op-code) field composed of 16 bits, the 0th to 15th bits; an addition result field composed of four bits, the 16th to 19th bits, and indicating the addition result $G^0$; an element number register specifying field $G^1$ composed of four bits, the 20th to 23rd bits, and indicating the register in which the element number n is stored; an inter-element distance register specifying field X composed of four bits, from the 28th to 31st bits, and indicating the register in which the inter-element distance is stored; a base address register specifying field B composed of four bits, from the 32nd to 35th bits and indicating the register in which the base address is stored; and a displacement address register specifying a field composed of 12 bits, from the 36th to 47th bits, and indicating the register in which the displacement address DISP is stored.

Figure 4:
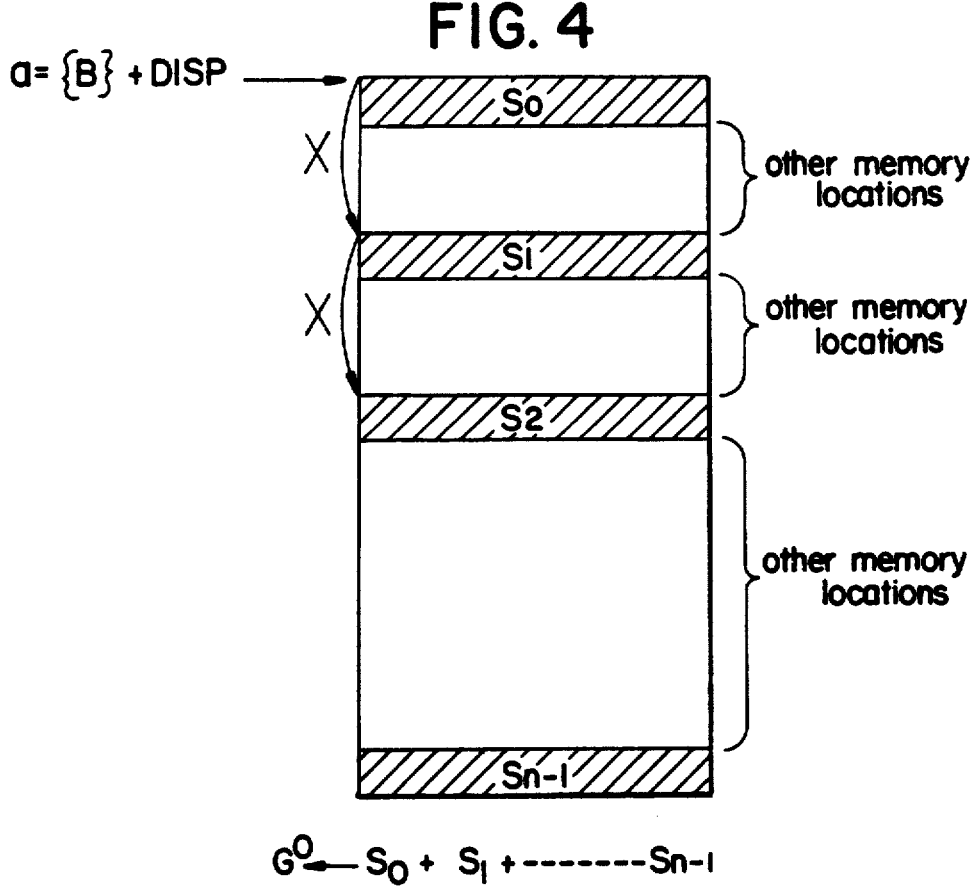
FIG. 4 is a diagram illustrating the composition of the adding (SUM) instruction.

Referring now to FIG. 4, an initial val $S_0$ is stored in an address of a main memory, represented by the addition result $a_0$ of the base address {B}, which is the content of the base address register specifying field B, and the displacement address DISP. In the memory positions of the main memory, from this address $a_0$, at the intervals of the inter-element distance X are stored $n-1$ elements, $S_1, S_2, \ldots S_{n-1}$. The adding (SUM) instruction, shown in FIG. 3, is an instruction to add this initial value $S_0$ and the $n-1$ elements $S_1, S_2, \ldots S_{n-1}$, and to store the addition result $G^0$ in a register.

In a preferred embodiment of the present invention, the function of the adding (SUM) instruction is performed by the execution of a subroutine.

Figure 6:
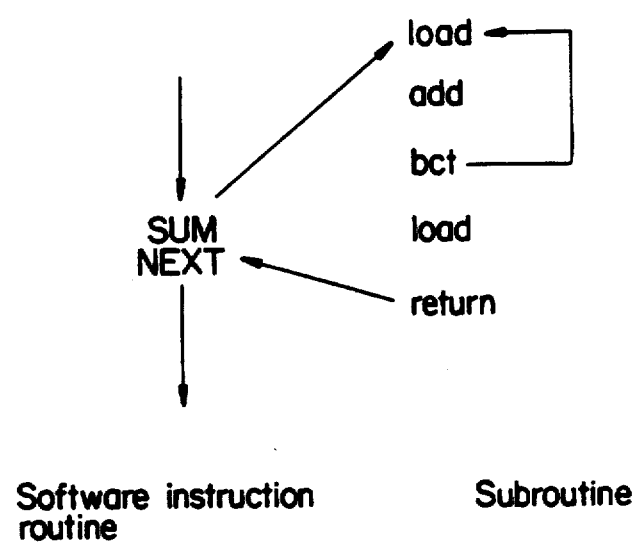
FIG. 6 is a diagram illustrating the composition of a subroutine.

Referring to FIG. 6, the subroutine consists of "load", "add", "branch on count", "load" and "return" instructions. Therefore, at the adding (SUM) instruction, the control is transferred to the "load" instruction, which is the leading instruction of the program, followed by a successive execution of the ensuing instructions of the subroutine. At the "return" instruction, which is the final instruction of the subroutine, the control is shifted to the NEXT instruction to be executed next to the adding (SUM) instruction of the software instruction routine.

Referring now to FIGS. 7A and 7B, in the operation of the adding (SUM) instruction and the instructions constituting the subroutine, there are used work registers ($A_0, A_1, A_2, A_3, A_8, A_9$ and $A_{10}$ of FIG. 1), which make up a characteristic feature of the present invention. These work registers are built into the preferred embodiment of the invention to be described in detail below.

Figure 1:
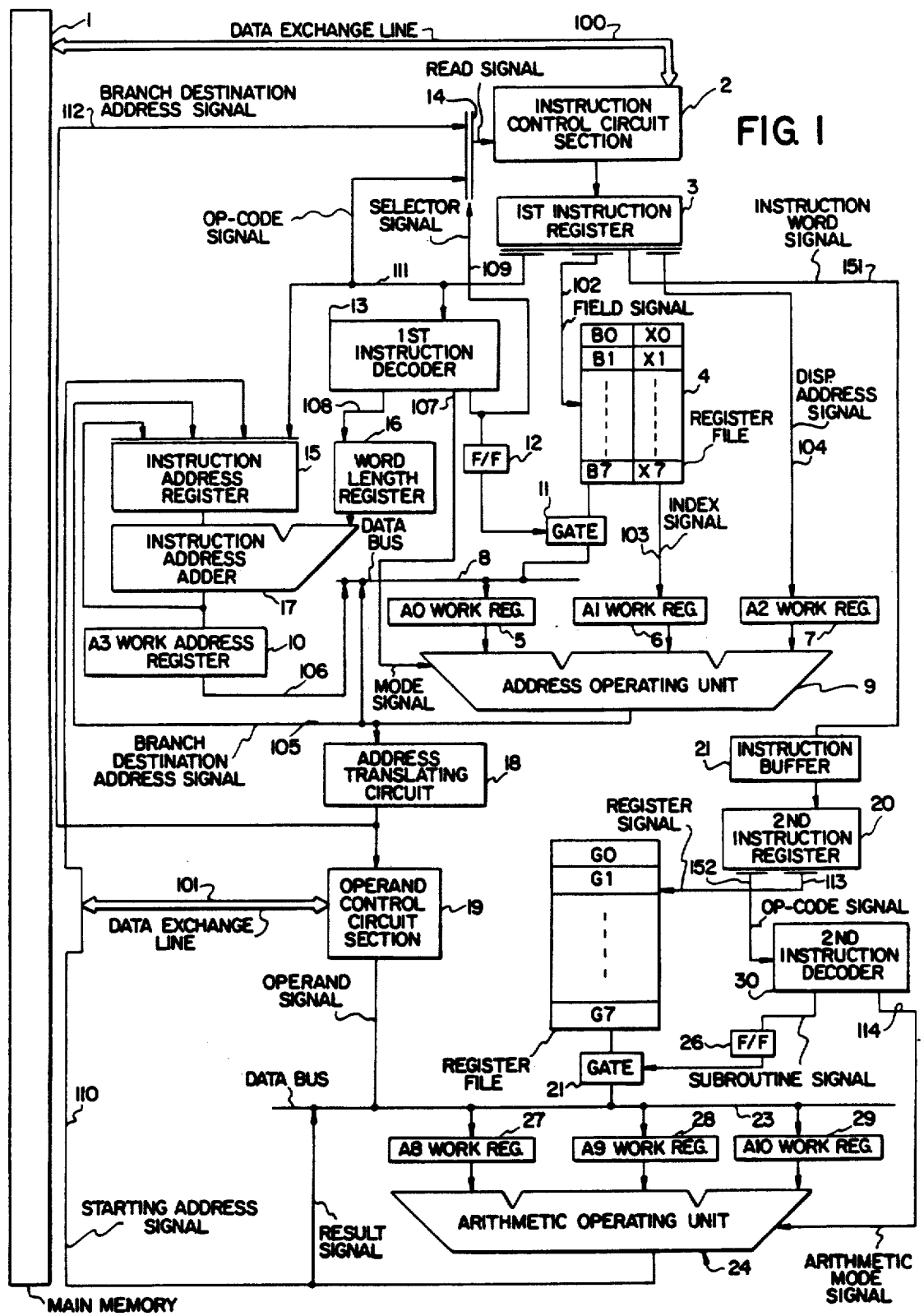
FIG. 1 is a diagram illustrating a preferred embodiment of the invention.

Referring to FIG. 1, the preferred embodiment of the invention comprises a main memory unit 1 for storing instructions and data; an instruction-control-circuit section 2 including an instruction cache memory for storing a partial copy of the instructions stored in the main memory unit 1 and a control circuit therefor; a line 100 for exchange of data between the instruction control circuit section 2 and the main memory unit 1; and a first instruction register 3 for holding an instruction from the instruction cache memory of said instruction control unit section 2. Further provided are a first decoder 13 for decoding the op-code part of an instruction word given from the first instruction register 3 by way of a line 111, and generating signals including an adding mode signal 107 for an address operating unit, a signal 109 for indicating subroutine operation, and an instruction word length 108 of the instruction; a flipflop (F/F) 12 for indicating that the subroutine is in operation, set and reset in response to the signal 109 from the first decoder 13; a register file 4 provided with a group of base registers ($B_0$ to $B_7$) and a group of index registers ($X_0$ to $X_7$) defined by a first type of software instruction and so composed as to simultaneously read the contents of the base registers and of the index registers in response to a search according to the contents of the register specifying fields B and X of the first instruction register 3, given via the line 102; a data bus 8; a bidirectional gate 11 operating when storing data on the data bus 8 in the register file 4 or reading the contents of the base register and index register of the register file 4 on the data bus 8 and prohibiting reading from the register file 4 in response to indication by the F/F 12 of the operation of the subroutine; a work register $A_0$ 5 for address operation to set data or information from the data bus 8; a work register $A_1$ 6 for setting the value of the index register read out of the register file 4 and given by way of a line 103; a work register $A_2$ 7 for storing the displacement address of the instruction word held in the first instruction register 3 and given by way of a line 104; an address operating unit 9 for adding the contents of the work registers 5 to 7 in response to the adding mode signal 107 from the first instruction decoder 13; an instruction address register 15 for holding the address of an instruction in the address operating stage to set a starting address given by way of a signal line 110 at the time of starting, a branch destination address given from the address operating unit 9 given by way of a line 105 at the time of executing a branch instruction, and a subroutine address, which is an op-code, given from the first instruction register 3 by way of a signal line 111 at the time of starting the subroutine; an instruction word length register 16 for storing the word length of an instruction given from the first instruction decoder 13 and specified by an address stored in the instruction address register 15; an instruction address adder 17 for adding an instruction address from the instruction address register 15 and the instruction word length from the instruction word length register 16; and a work address register $A_3$ 10 for holding the address of the next instruction (hereinafter called link address) to a software instruction of the first type given from the instruction address adder 17 and to be executed mainly according to the subroutine. The embodiment further provides for an address-translating circuit 18 for translating a logical address operated by the address operating unit 9 into a physical address of the main memory unit 1; an address selecting circuit 14 for choosing between a branch destination address, which is a physical address, given from the address-translating circuit 18 by way of a line 112 at the time of executing the branch instruction in response to an output given from the first instruction decoder 13 via the line 109, and the op-code as address information given from the first instruction register 3 by way of a line 111 at the time of setting the software instruction of the first type in the first instruction register 3, and outputting an instruction read address to the instruction-control-circuit-section 2; an operand control circuit section 19 including a cache memory for exchanging data with the main memory unit 1 by way of a signal line 101 and storing a copy of an operand of the main memory unit 1, and supplying the operand in response to the physical address from the address-translating circuit 18; an instruction buffer 21 for storing an instruction word from the first instruction register 3 to achieve synchronism with the operand; a second instruction register 20 for holding the instruction word in the arithmetic operation section, given from the instruction buffer 21; and a register file 22, provided with a group of general purpose registers ($G_0$ to $G_7$) defined by a software instruction of the first type, for reading the contents in response to a search by the register specifying part of the instruction word of the second instruction register 20, given by way of a signal line 113 still further included are a second instruction decoder 30 for decoding the op-code of the instruction word of the second instruction register 20 and generating a signal indicating that the miniprogram is in operation and another signal indicating the arithmetic operating mode; a flipflop (F/F) 26 for indicating that the subroutine is in operation, set by a subroutine operation indicating signal from the second instruction decoder 30; a bidirectional gate 25 for prohibiting reading from the register file 22 in response to the turning-on of this F/F 26 and reading data from a data bus 23 into register file 22 or the contents of the group of general purpose registers ($G_0$ to $G_7$) in the register file 22 onto the data bus 23 in response to the turning-off of the F/F 26; the data bus 23; work registers $A_8$ 27, $A_9$ 28 and $A_{10}$ 29 for setting data from the data bus 23; and an arithmetic operating unit 24 for operating on the contents of the work registers $A_8$ 27, $A_9$ 28 and $A_{10}$ 29 as instructed by a signal indicating the arithmetic operating mode, given from the second instruction decoder 30 by way of a line 114, and sending the result of arithmetic operation to the group of general purpose registers ($G_0$ to $G_7$) in the register file 22, the operand control circuit section 19 or the work registers $A_8$ 27, $A_9$ 28 and $A_{10}$ 29 via the line 110 and the data bus 23.

Now will be described in detail the operation of the preferred embodiment of the present invention.

Figure 2:
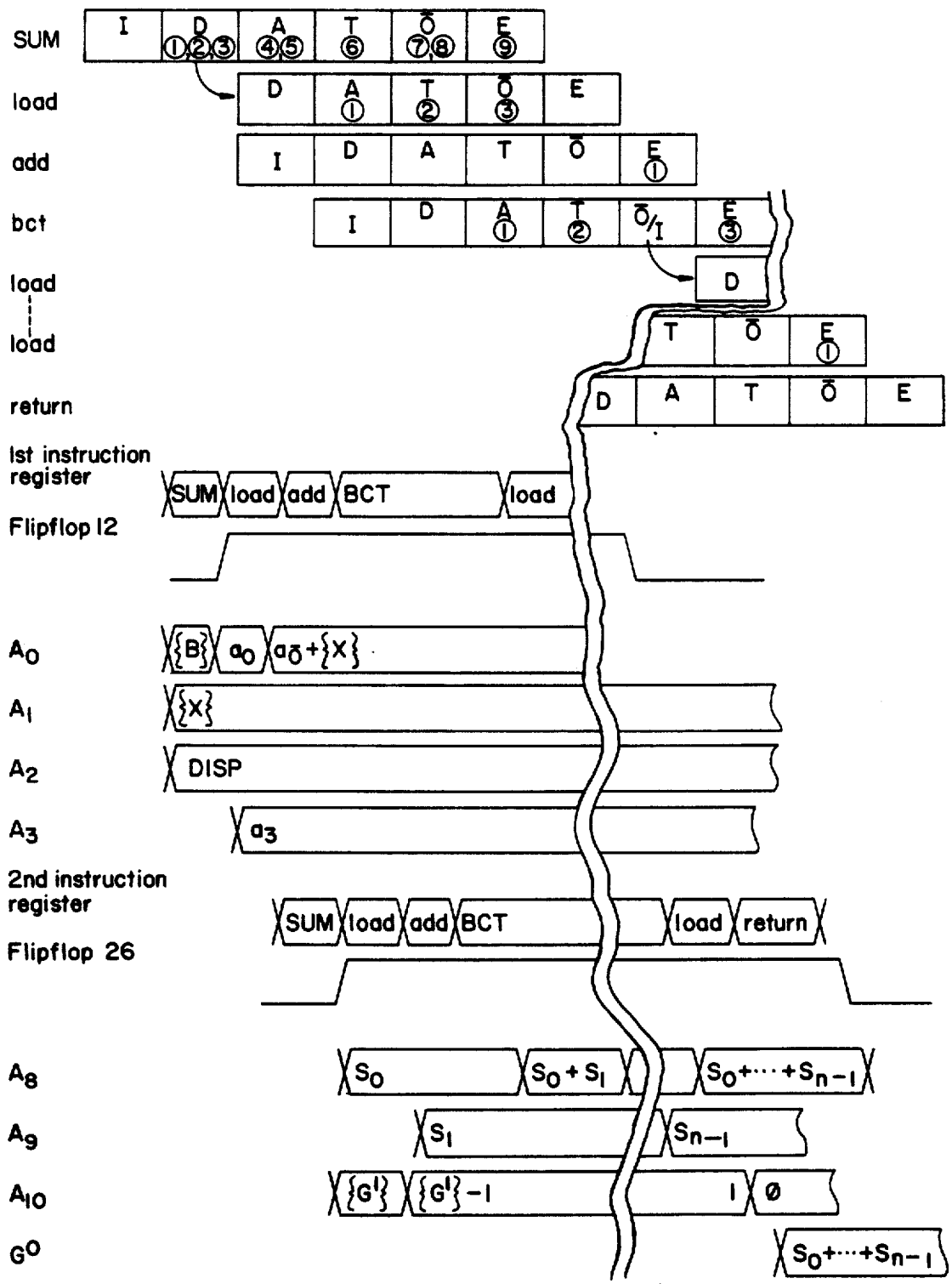
FIG. 2 is a diagram for explaining the operation of the embodiment of the invention.

Referring to FIGS. 1 and 2, the embodiment of the invention is placed under a pipeline control arrangement consisting of an instruction fetch stage I executed by the instruction-control-circuit-section 2; an instruction decode stage D to decode an instruction, held by the first instruction register 3, with the first instruction decoder 13; an address calculation stage A executed by the address operating circuit section 4; an address converting stage T executed by the address-translating circuit 18; an operand fetch stage 0 executed by the operand control circuit section 19; and an arithmetic operation stage E executed by the arithmetic operating unit 24.

First the adding (SUM) instruction, illustrated in FIG. 4, is read out of the instruction control circuit section 2, and set in the first instruction register 3. In response to this setting, a series of actions listed in FIG. 7A are executed to start the operation of hardware for running the subroutine.

Referring now to FIGS. 1, 2 and 7A together, the adding (SUM) instruction is read out of the instruction control circuit section 2 in the instruction fetch stage I, and set in the first instruction register 3. The op-code of this adding (SUM) instruction set in the first instruction register 3 is decoded by the first instruction decoder 13, and a signal indicating the subroutine operating mode is set in the flipflop 12 (see ① for the adding (SUM) instruction in FIG. 7A).

Along with the setting of this mode, the op-code of the adding (SUM) instruction is fed to the instruction cache memory (not shown) of the instruction control circuit section 2 via the line 111 and the address selecting circuit 14. This op-code of the adding (SUM) instruction serves as the leading address $a_2$ of a SUM subroutine. According to this address the leading instruction of the SUM subroutine is read out of the instruction cache memory (see ② for the adding (SUM) instruction in FIG. 7A). Further, the contents {B} and {X} of the base registers $B_0$ to $B_7$ and the index registers $X_0$ to $X_7$, respectively, indicated by the instruction word of the adding (SUM) instruction are read out of the register file 4 and, as they are set in each of the work registers $A_0$ and $A_1$, the content of the displacement part of the instruction word, stored in the first instruction register 3, is set in the work register $A_2$ (see ③ in FIG. 7A).

Next, at the address computing stage A, the base address B stored in the work register $A_0$ and the content of the displacement part stored in the work register $A_2$ are put to arithmetic operation by the address operating unit 9, and the resultant developed address value $a_0$ is stored in the work register $A_0$ via the data bus 8 (see ④ in FIG. 7A). At the same time, the instruction address of the adding (SUM) instruction stored in the instruction address register 15 and the instruction word length stored in the instruction word length register 16 are added by the instruction address adder 17, and the instruction address $a_3$, next to the adding (SUM) instruction, is stored in the work register $A_3$ (see ⑤ of FIG. 7A).

Along with this processing of the address operation stage A for the adding (SUM) instruction, the "load" instruction, which is the leading instruction of the SUM subroutine, and the "add" instruction are successively stored in the first instruction register 3.

The logical address $a_0$ of the operand, produced at the address operation stage A by the address operating unit 9, is translated into a physical address by the address translating circuit 18 at the address translating stage T (see ⑥ in FIG. 7A).

At the operand fetch stage 0, in response to the physical address of the operand from the address-translating circuit 18, the operand control circuit section 19 reads out the first operand $S_0$, which is stored in the work register $A_8$ (see ⑦ in FIG. 7A). Before this storing in the work register $A_8$, the adding (SUM) instruction, previously stored in the first instruction register 3, is stored in the second instruction register 20 via the instruction buffer 21. At a timing next to this storing, the op-code of an instruction stored in the second instruction register 20 is decoded by the second instruction decoder 30. However, as the adding (SUM) instruction stored in the second instruction register 20 is a software instruction of the first type, the F/F 26 is not set. Therefore, in response to the content of the register specifying part of the instruction word stored in the second instruction register 20, the number of elements from the register $G_1$ of the register file 22 is stored in the work register $A_{10}$ 29 via the bidirectional gate 25 and the data bus 23 (see ⑧ in FIG. 7A). From the element number $\{A_{10}\}$ stored in the register $A_{10}$ in this manner 1 is subtracted by the arithmetic operating unit 24 in response to an instruction from the second instruction decoder 30, and the result of subtraction is stored in the register $A_{10}$ via the data bus 23.

Incidentally, in the second instruction register 20 are successively stored, after the adding (SUM) instruction, software instructions of the second type from the "load" instruction onward. As a result, the F/F 26 is turned on, and the bidirectional gate 25 prohibits data reading operation out of the register file 22.

After this initial setting by the adding (SUM) instruction shown in FIG. 7A, the subroutine illustrated in FIG. 7B is executed. As shown in FIG. 2, the control of the adding (SUM) instruction and the subroutine, respectively shown in FIGS. 7A and 7B, is achieved by a pipeline formula, and the executing efficiency of the miniprogram is improved.

The present invention makes possible efficient processing by describing the addition of n elements $S_0, \ldots S_{n-1}$ by the adding (SUM) instruction and executing the subroutine shown in FIG. 7B under pipeline control.

The advantages of the present invention will be described in detail below by way of comparison of this processing according to the invention and the subroutine procedure of the prior art.

The following table shows the program of a routine to add n elements by the conventional subroutine procedure.

TABLE

| | | | | |
|---|---|---|---|---|
| | | * Main routine | | |
| STM | | | | Saving the content of the register |
| | BAL | $B_1, a_1$ | ① | Branching to leading address $a_1$ of subroutine procedure |
| | | | ② | $B_1 \leftarrow a_3$ |
| $a_3$ | NEXT | | | |
| | | * Subroutine procedure | | |
| $a_1$ | LDX | $X_1, 0$ | | $X_1 \leftarrow 0$ |
| | LD | $G_0, 0$ | | $G_0 \leftarrow 0$ |
| | LD | $G_2$, a ($B_0, X_1$, DISP) | | $G_2 \leftarrow S_i (i = 0 \ldots n-1)$ |
| $a_2$ | ADD | $G_0, G_2$ | | $G_0 \leftarrow G_0 + G_2$ |
| | ADDX | $X_1, X_0$ | | $X_1 \leftarrow X_1 + X_0$ |
| | BCT | $G_1, a_2$ | ① | $G_1 \leftarrow G_1 - 1$ |
| | | | ② | If $G_1 \neq 0$, then go to $a_2$ |
| | LM | | | Recovery the contents of the registers |
| | BR | $B_1$ | | Return to $a_3$ of main routine |

Figure 5:
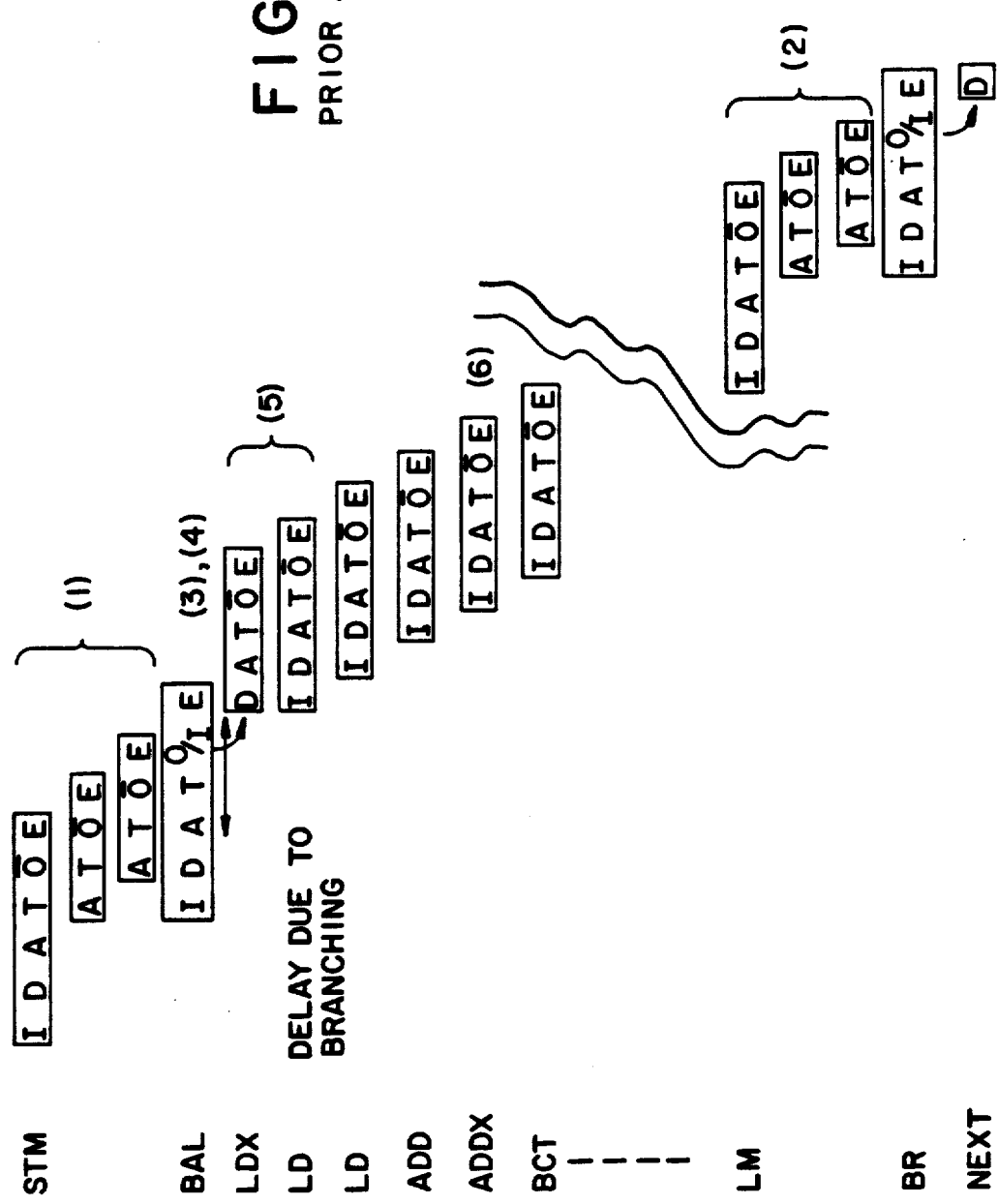
FIG. 5 is a diagram for explaining the Operation of a prior art subroutine program, which is tabulated in the text.

Referring to FIG. 5 and the table, the execution of the subroutine by the prior art requires registers $G_2, X_1$ and $B_1$ besides the registers $G_0, G_1, X_0$ and $B_0$ prescribing the operation of this adding routine. Therefore, in order to continue processing after the execution of the subroutine, the values of the registers $G_2, X_1$ and $B_1$ of the main routine before the shift to the subroutine should be temporarily saved in a memory before the subroutine execution. For this purpose, an STM instruction has to be executed (see FIG. 5 (1)).

Further, upon completion of the subroutine execution, an LM instruction has to be executed to recover the values of the registers (see FIG. 5 (2)).

Further, there is a need to execute a branching (BAL) instruction to jump from the main routine to the beginning of the subroutine (see FIG. 5 (3)). The execution of this branching instruction requires the time taken for an address operation to fetch a branch destination instruction and address translation, resulting in an idle time in the pipeline.

Besides that, there is needed a register $B_1$ to hold the leading address of the next (NEXT) instruction to the branching (BAL) instruction to prepare, for a return from the subroutine (see FIG. 5 (4)). Also, to be executed, at the outset in executing the subroutine, an LDX instruction and an LD instruction to clear the contents of the required registers ($X_1$ and $G_0$) (see FIG. 5 (5)).

A software instruction by the prior art usually is usable by itself to simultaneously update the contents of index registers in connection with address operations to fetch various elements and those of general purpose registers for arithmetic operation. Therefore, an ADDX instruction is needed to update the index registers (see FIG. 5 (6)).

As shown in FIG. 5, even if each instruction is executed under pipeline control, there will be idle times for the pipeline during pre- and post-processing incidental to the adding routine and the execution of the branching instruction, which the shift from the main routine to the subroutine entails, besides the essential operation of the adding routine.

By contrast, the present invention, by providing a sufficient number of work registers, has dispensed with the recovery operation as well as saving operation of registers in executing the routine by a second software instruction for handling these work registers.

The shift from a first to a second software instruction can eliminate disturbance of pipeline control due to the execution of a branching instruction through the operation of the branch destination address and address translation by directly reading the leading instruction of the second software instruction group from the op-code of the first software instruction, and accordingly can reduce the waste of time accompanying the shift.

When returning from the subroutine comprising software instructions of the second type to a software program of the first type, a branching instruction is executed by reading a return address stored in a work register. Therefore, the return operation can be completed without having to use a register defined by a software instruction of the first type.

Furthermore, the actions shown in FIG. 7B, which take place in response to the reading of software instructions of the first type, develop the information described in instructions in the registers of different stages constituting the pipeline of the hardware, and set an environment for running the subroutine comprising software of the second type. Therefore, there is no need for any particular action to clear the registers, and a smooth shift to the subroutine is thereby facilitated. If such an instruction as will update the register $A_9$ for the arithmetic operating purpose and the register $A_0$ for address operation is defined as a software instruction of the second type, like the "load" instruction in the subroutine of FIG. 7B, it will be made possible to let pipeline control function more effectively, and to reduce the number of times instructions are executed.

Further, a microprogram according to the present invention and one of the prior art can also be compared in the following respects.

The present invention realizes a part of the first software instruction group with a program composed of the second group of software instructions. Therefore, the interface with hardware is simplified, and the number of manhours previously required for designing the functions of a microprogram can be substantially reduced.

Besides that, the present invention adds new instructions to such functions as cannot achieve adequate performance with software realized with the conventional architecture on account of a register shortage, provides a sufficient number of work registers for realizing the additional instructions, and prepares a subprogram free from waste due to a register shortage. Accordingly, the present invention has the advantage of improving the processing performance.

What is claimed is:

1. A data processor comprising:
    a main memory to store instructions and data;
    an instruction control circuit coupled to said main memory;
    a first instruction register, coupled to said instruction control circuit, to store instructions received from said instruction control circuit;
    a first instruction decoder, coupled to said first instruction register, to decode a first op-code portion of an instruction received from said first instruction register, said first instruction decoder generating a subroutine signal which indicates whether a subroutine is specified by an instruction, said first instruction decoder also generating an adding mode signal and a word length;
    a first register file, coupled to said first instruction register, to store base and index information, said first register file being searchable using fields of an instruction stored in said first instruction register;
    a first bidirectional gate, coupled to said first register file and to said first instruction decoder, to prohibit reading contents of said first register file when said subroutine signal indicates that a subroutine is specified;
    a first data bus coupled to said first bidirectional gate;
    a zeroth work register, coupled to said first data bus, to store information received from said first data bus;
    a first work register, coupled to said first register file, to store index information received from said first register file;
    a second work register, coupled to said first instruction register, to store a displacement address received from said first instruction register;
    an address operating unit, coupled to said zeroth, first, and second work registers, to add contents of said zeroth, first, and second work registers together in response to said adding mode signal, said address operating unit generating a logical address;
    an instruction address register, coupled to said address operating unit, to store one of a starting address, a branch destination address, and a subroutine address as an instruction address;
    an instruction word length register, coupled to said first instruction decoder, to store said word length;
    an instruction address adder, coupled to said instruction address register and to said instruction word length register, to add said instruction address and said word length together;
    a third work address register, coupled to said instruction address adder, to store a link address received from said instruction address adder;
    an address translating circuit, coupled to said address operating unit, to translate said logical address into a physical branch destination address of said main memory;
    an address selection circuit to select either said branch destination address or said first op-code portion as an instruction read address in accordance with said subroutine signal and to output said instruction read address to said instruction control circuit;
    a second instruction register to store an instruction word received from said first instruction register;
    a second register file, coupled to said second instruction register, which includes a plurality of general purpose registers searchable by a register specifying portion of an instruction word stored in said second instruction register;
    a second instruction decoder, coupled to said second instruction register, to decode a second op-code of said instruction word stored in said second instruction register to generate a subroutine operation signal and an arithmetic operating mode signal;
    a second data bus coupled to said address translating circuit;
    a second bidirectional gate, coupled to said second register file, to prevent reading said second register file when said subroutine operation signal is in a first state and to permit communication between said second register file and said second data bus when said subroutine operation signal is in a second state;
    a plurality of work registers coupled to said second data bus to store operands; and
    an arithmetic operating unit, coupled to said plurality of work register, stop perform operations on said operands in accordance with said arithmetic operating mode signal.

2. A data processor comprising;

a main memory to store instruction and data;

an instruction control circuit coupled to said main memory;

a first instruction register, coupled to said instruction control circuit, to store instructions received from said instruction control circuit;

a first instruction decoder, coupled to said first instruction register, to decode a first op-code portion of an instruction received from said first instruction register, said first instruction decoder generating a subroutine signal which indicates whether a subroutine is specified by an instruction, said first instruction decoder also generating an adding mode signal and a word length;

a first register file, coupled to said first instruction register, to store base and index information, said first register file being searchable suing fields of an instruction stored in said first instruction register;

a first bidirectional gate, coupled to said first register file and to said first instruction decoder, to prohibit reading contents of said first register file when said subroutine signal indicates that a subroutine is specified;

a first work register, coupled to said first register file, to store index information received from said first register file;

a second work register, coupled to said first instruction register, to store a displacement address received from said first instruction register;

an address operating unit, coupled to said first and second work registers, to add contents of said first and second work registers together in response to said adding mode signal, said address operating unit generating a logical address;

an instruction address register, coupled to said address operating unit, to store one of a starting address, a branch destination address, and a subroutine address as an instruction address;

an instruction word length register, coupled to said first instruction decoder, to store sad word length;

an instruction address adder, coupled to said instruction address register and to said instruction word length register, to add said instruction address and said word length together;

a third wok address register, coupled to said instruction address adder, to store a link address received from said instruction address adder;

an address selection circuit to select either said branch destination address or said first op-code portion as an instruction read address in accordance with said subroutine signal and to output said instruction read address to said instruction control circuit;

a second register file which includes a plurality of general purpose registers searchable by a register specifying portion of an instruction word;

a second instruction decoder to generate a subroutine operation signal and an arithmetic operating mode signal;

a second bidirectional gate, coupled to said second register file, to prevent reading said second register file when said subroutine operation signal is in a first state and to permit communication with said second register file when said subroutine operation signal is in a second state;

a plurality of work registers to store operands; and an arithmetic operating unit, coupled to said plurality of work registers, to perform operations on said operands in accordance with said arithmetic operating mode signal.

3. A data processor comprising:

an instruction control circuit;

a first instruction register, coupled to said instruction control circuit, to store instructions received from said instruction control circuit;

a first instruction decoder, coupled to said first instruction register, to decode a first op-code portion of an instruction received from said first instruction register, said first instruction decoder generating a subroutine signal which indicates whether a subroutine is specified by an instruction, said first instruction decoder also generating an adding mode signal and a word length;

a first register file, coupled to said first instruction register, to store base and index information, said first register file being searchable using fields of an instruction stored in said first instruction register;

a first bidirectional gate, coupled to said first register file and to said first instruction decoder, to prohibit reading contents of said first register file when said subroutine signal indicates that a subroutine is specified;

a first work register, coupled to said first register file, to store index information received from said first register file;

a second work register, coupled to said first instruction register, to store a displacement address received from said first instruction register;

an address operating unit, coupled to said first and second work registers, to add contents of said first and second work registers together in response to said adding mode signal, said address operating unit generating a logical address;

an instruction address register, coupled to said address operating unit, to store one of a storing address, a branch destination address, and a subroutine address as an instruction address;

a third work address register to store a link address;

an address selection circuit to select either said branch destination address or said first op-code portion as an instruction read address in accordance with said subroutine signal and to output said instruction read address to said instruction control circuit;

a second register file which includes a plurality of general purpose registers searchable by a register specifying portion of an instruction word;

a second instruction decoder to generate a subroutine operation signal and an arithmetic operating mode signal;

a second bidirectional gate, coupled to said second register file, to prevent reading said second register file when said subroutine operation signal is in a first state and to permit communication with said second register file when said subroutine operation signal is in a second state;

a plurality of work registers to store operands; and an arithmetic operating unit, coupled to said plurality of work registers, to perform operations on said operands in accordance with said arithmetic operating mode signal.

* * * * *